Jan. 3, 1950  L. T. SACHTLEBEN  2,493,088
PHOTOGRAPHIC SOUND RECORDING APERTURE MASK
Filed Sept. 13, 1947
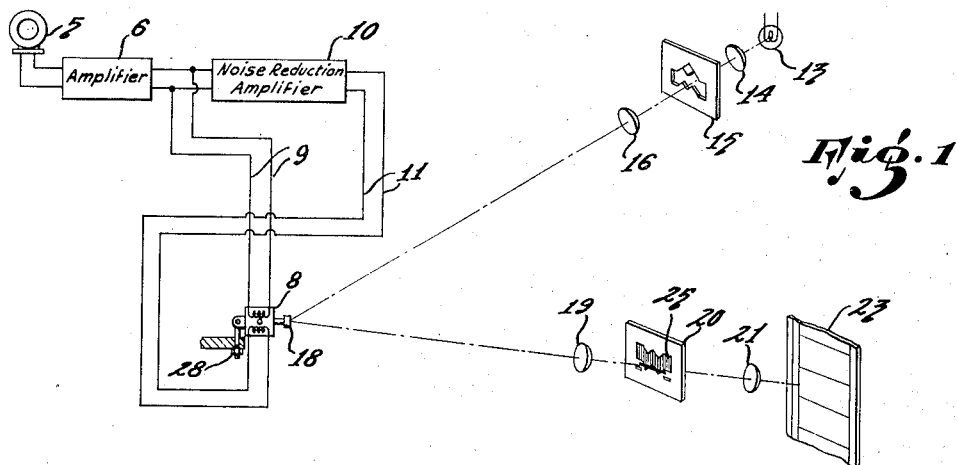
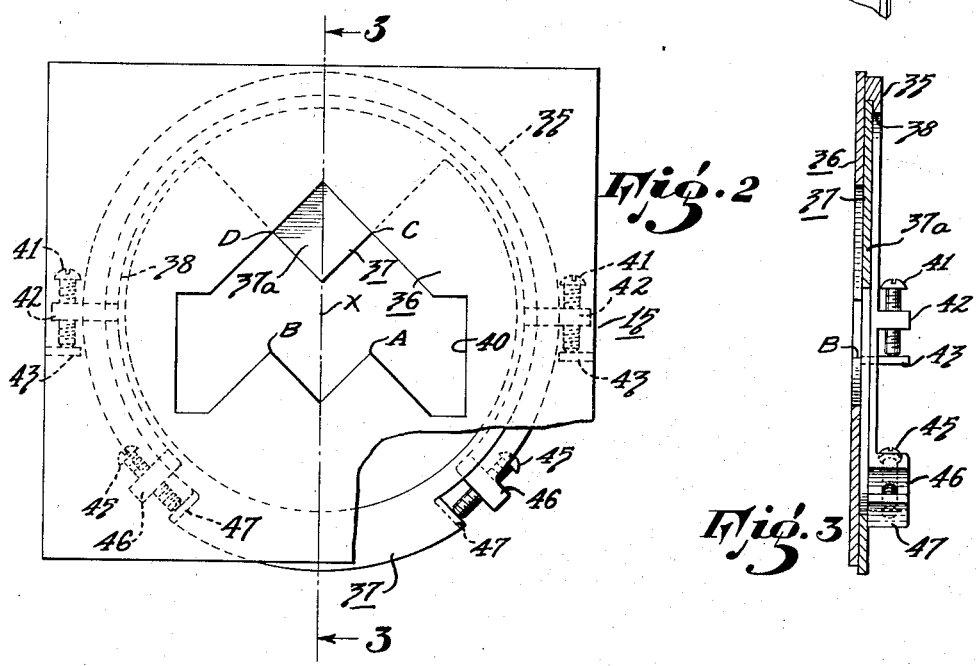
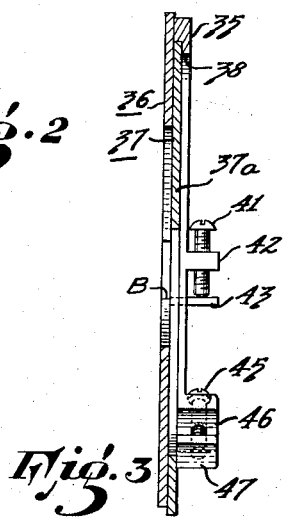
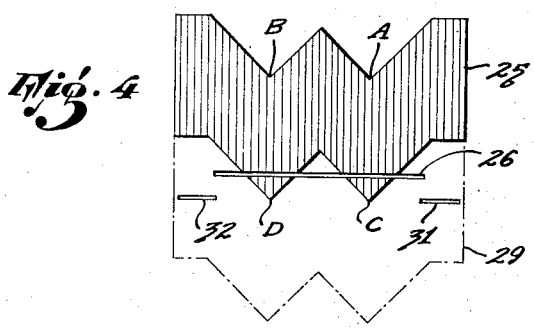
Lawrence T Sachtleben,
INVENTOR.
BY
ATTORNEY Patented Jan. 3, 1950

2,493,088

UNITED STATES PATENT OFFICE 2,493,088

PHOTOGRAPHIC SOUND RECORDING APERTURE MASK

Lawrence T. Sachtleben, Haddonfield, N. J., assignor to Radio Corporation of America, a corporation of Delaware Application September 13, 1947, Serial No. 773,765

7 Claims. (Cl. 179—100.31)

This invention relates to sound recording systems, and particularly to the type of sound recording system disclosed and claimed in Dimmick copending application, Ser. No. 742,545, filed April 19, 1947, now U. S. Patent No. 2,468,049, issued April 26, 1949.

The type of sound recording system disclosed in the above-mentioned copending patent application utilizes a W-shaped light aperture for forming the light into a beam of the same shape and which is projected on a light slit. The principal feature of this system is that two types of sound records may be recorded by the simple expedient of shifting the point about which the galvanometer mirror is vibrated. That is, one side edge of the W-shaped beam will produce a negative sound record when vibrated across the slit, while the other side edge of the light beam, when vibrated across the slit, will impress light on the film so that a direct positive sound record results upon a normal developement of the emulsion. The shape of the beam provides a double bilateral sound record in which noise reduction is obtained by biasing the light beam so that the vertices of the illuminated plane angles are accurately positioned with respect to the slit aperture. The present invention, therefore, is directed to an aperture mask construction which permits adjustment of these vertices with respect to the light slit for both negative and positive recording.

The principal object of the invention, therefore, is to facilitate the recording of sound.

Another object of the invention is to provide an improved sound recording light aperture for recording both negative and positive records.

A further object of the invention is to provide an improved system for adjusting the shape of a light beam forming aperture and its position with respect to a light recording slit.

A still further object of the invention is to provide a light aperture adjusting mechanism for positioning the various portions of the light beam formed thereby with respect to a second light aperture.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 1 is a diagrammatic view of a sound recording system utilizing the invention.

Fig. 2 is an elevational view of the aperture mask of the invention.

Fig. 3 is a cross-sectional view of the aperture mask taken along the line 3—3 of Fig. 2, and Fig. 4 is an elevational view showing one adjustment of the light beam with respect to the slit mask.

Referring now to the drawings, in which the same numerals identify like elements, a microphone 5 feeds an amplifier 6, which, in turn, feeds a modulating winding of a galvanometer 8 over conductors 9 and a noise reduction amplifier 10. The output of the noise reduction amplifier 10 is connected over conductors 11 to the bias or noise reduction winding of the galvanometer 8.

The optical portion of the system includes an exciter lamp 13, collecting lens 14, an aperture mask 15, projecting lens 16, the mirror 18 of the galvanometer 8, a condensing lens 19, a slit mask 20, and an objective lens 21, the light through the above elements being impressed upon the sound track area of a film 23. The shape of the light beam is shown by the ruled lines 25, and it is shown positioned on the slit 26 for recording a negative record. When the light beam 25 is shifted by the mechanism 28 to the position shown by the broken lines 29 in Fig. 4, light will pass through slits 31 and 32 in addition to slit 26 to provide a direct positive record. The details of this recording system are described in the above-mentionel Dimmick copending application.

In providing an aperture in the mask 15, it is extremely difficult to accurately construct the opening so that not only are the points A, B, C, and D correctly positioned with respect to one another, but also with respect to the slit 26. It is realized that in adjusting the light beam at zero signal by moving mirror 18, the pairs of points A—B and C—D must be positioned such that they overlap the slit in the same and proper amount to provide the zero or bias lines of the double bilateral sound record. In the instance of the direct positive adjustment, the same and proper amount of light must be eliminated from the film to produce the same zero lines. Furthermore, this adjustment must be accurate in order that each portion of the double bilateral sound record has the same width for the same amplitude of signal. Thus, instead of forming the light aperture in a single element or plate, it is formed of two elements which are rotatably adjustable with respect to one another on the same axis.

Referring now to Figures 2 and 3, a main supporting plate or frame 35, which may be rotatable on an axis X, if desired, has mounted thereon two rotatable plates 36 and 37, these plates being rotatable about the same axis X. The frame 35 may be of substantially C-form and encompasses a large, circular opening 38. The plate 36 is mounted against the frame 35 and has an opening 40 therein having one side edge shaped like a W and the opposite side edge shaped like an inverted V. The plate 37 is mounted in an annular groove of the frame 35 and is formed with a central opening defined in part by an opaque, sector shaped projection or member 37a which is located behind the inverted V-shaped portion of the opening 40. Thus, if the opposed, working, side edges of the aperture are considered, it will be noted that a double W-shaped opening is provided. Rotation of the plate 36 is obtained by two opposing screws 41 which pass through ears 42 formed on the frame 35 and which abut extensions or lugs 43 on the plate 36. The plate 37 may be rotated by two opposing screws 45 which extend through ears 46 on the ends of the frame 35 and which engage extensions 47 on the plate 37.

Therefore, to obtain an accurate arrangement of points A, B, C, and D with respect to each other and with respect to slit 26, the following steps are followed. First, the aperture plate 36 is rotated and adjusted so that points A and B lie in their proper positions on slit 26. This rotation moves one vertex toward the light slit as the other vertex moves away from the slit. The plate is then locked in position with respect to the mounting plate 35 by screws 41 or any other suitable set screw. The mirror 18 is then adjusted to bring the points C and D to slit 26, and then plate 37 is adjusted so that points C and D lie on the slit 26 at their proper positions. Rotation of the sector-shaped plate moves point C toward the slit as point D moves away from the slit, and vice versa. The plates 36 and 37 are then permanently locked to each other and to the main plate 35, and the aperture is of the proper shape to provide the desired light beam correctly positioned with respect to the slits in plate 20. In this manner, extremely close manufacturing tolerances are avoided in the manufacture of the aperture.

I claim:

1. An aperture mask construction providing a single W-shaped light beam having two opposite side recording edges and in which the distance between said recording side edges is greater than the transverse movement of said beam during recording, comprising a main plate, a second plate mounted thereon having an aperture with a W configuration along one side edge, a V configuration along the opposite side edge and parallel end edges, said W side edge being used for recording and a third plate having a sector-shaped section extending across the V-shaped side edge of said aperture in said second plate to provide a double W configuration for said aperture, said sector section and portions of said side edge having said V configuration also being used for recording.

2. A light beam forming aperture mask for forming a single W-shaped light beam having two opposite side edges used for recording and in which the distance between said recording side edges is greater than the transverse movement of said beam during recording, comprising a plate having an opening therethrough, a second plate rotatable on said first plate and having an aperture with a W configuration along one side edge, a V configuration along the opposite side edge and parallel end edges, said W side edge being used for recording and a third plate rotatable on said second plate, said third plate having a sector-shaped section extending into the aperture of said second plate to form a second W side edge configuration for use in recording.

3. An aperture mask in accordance with claim 2, in which means are provided for rotating said second and third plates with respect to each other on the same axis.

4. A light beam defining aperture structure comprising a plate having an opening therein of a size larger than the final light beam aperture which defines the recording light beam, a second plate having an opening therein of a size larger than the final aperture, one side edge, a portion of the opposite side edge and the parallel end edges of the opening in said second plate forming said final aperture, and a third plate having an opening therein larger than said final aperture, a portion of the edge of the opening in said third plate forming the remaining side edge of said final aperture, said final opening defining a light beam having opposite W-shaped recording side edges, the distance between said recording side edges being greater than the transverse movement of said beam during recording.

5. A light beam defining aperture structure in accordance with claim 4, in which said second and third plates are rotatable with respect to one another to adjust the positions of opposite side edges of said final aperture.

6. A light beam defining aperture structure comprising a plate having an opening therein of a size larger than the final aperture which defines the light recording beam, one side edge of said opening, a portion of the opposite side edge of said opening and the parallel end edges of said opening forming said final light beam aperture, and a second plate having an opening therein larger than the final aperture, one portion of said second plate extending in to the opening in said first plate to form the remaining side edge of said final aperture, said final opening defining a light beam having opposite W-shaped recording side edges, the distance between said recording side edges being greater than the transverse movement of said beam during recording.

7. A light beam defining aperture structure in accordance with claim 6, in which said first mentioned side edge of the opening in said first plate is W-shaped, and its opposite side edge is V-shaped, said portion of said V-shaped side edge and the portion of said second plate extending into the opening in said first plate forming a second W-shaped edge to provide a double W-shaped aperture.

LAWRENCE T. SACHTLEBEN.

REFERENCES CITED

The following references are of record in the file of this patent:

UNITED STATES PATENTS

| Number | Name | Date |
| --- | --- | --- |
| 1,734,248 | Eldred | Nov. 5, 1929 |
| 2,092,407 | Schwarz | Sept. 7, 1937 |
| 2,096,576 | Dimmick | Oct. 19, 1937 |
| 2,199,621 | Dimmick | May 7, 1940 |
| 2,311,159 | Dimmick | Feb. 16, 1943 |